Dec. 5, 1967   E. E. STEPHENSON ET AL   3,356,469
COATED FUEL BODIES
Filed July 29, 1966

Inventor
George G. Rumberger
Edward E. Stephenson
By Hueschen and Korlandsky
Attys.

3,356,469
COATED FUEL BODIES
Edward E. Stephenson, Richland, and George G. Rumberger, Kalamazoo, Mich., assignors to Brown Company, Kalamazoo, Mich., a corporation of Delaware
Filed July 29, 1966, Ser. No. 568,965
4 Claims. (Cl. 44—6)

The present invention relates to fuel provided in lumps or large particles or bodies, and is more particularly concerned with charcoal briquettes and cannel coal so treated as to render them more easily ignitable and to reduce dust problems involved in their handling.

Fuel in lump or particulate form, such as charcoal or cannel coal, has become popular for use in outdoor grills or in fireplaces. Such types of fuel have the disadvantage that they are rather difficult to ignite without the aid of paper, wood, or combustible organic liquids. Moreover, such types of fuel are dusty and readily soil any object with which they come in contact.

It is an object of the present invention to provide a treated fuel in lump or large particle form which is readily ignited. It is a further object to provide such a large particulate fuel which is relatively free from dust and which therefore does not readily soil objects with which it comes into contact. It is an additional object to provide a fuel of the type described which is relatively inexpensive. The accomplishment of the foregoing and additional objects will become more fully apparent hereinafter.

Figure 1:
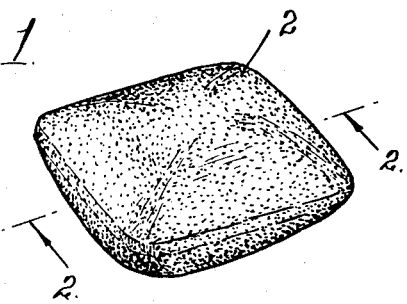
Figure 2:
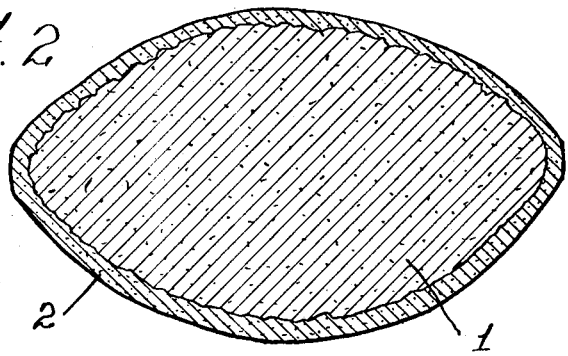

The invention in its preferred embodiment is illustrated by the accompanying drawing in which:

FIG. 1 is a perspective view of a charcoal briquette according to the invention; and FIG. 2 is a cross-sectional view taken at the line 2—2 of FIG. 1.

According to the invention, lump-form or large particulate fuel such as charcoal briquettes or cannel coal is provided with a coating of a composition comprising a wax and a finely particulate relatively non-flammable mineral material. When a flame is applied to the coating, as with a match or paper taper, the coating is readily ignited and continues to burn at a controlled rate until the fuel particle has become ignited. Moreover, the coated particles such as briquettes may be handled without releasing dust or causing soiling of any object with which the particles come into contact.

Reference is now made to the accompanying drawing for a better understanding of the invention. In FIGS. 1 and 2 a charcoal briquette is shown which has been treated according to the invention. As shown more clearly in FIG. 2, the briquette 1 is provided with a complete coating 2 of a composition according to the invention. The composition comprises wax and a finely particulate substantially non-flammable mineral material. When a lighted match is applied to the briquette the coating is readily ignited. The mineral particles appear to provide an increased surface which acts in the nature of a catalyst for the burning process, and enables the charcoal briquettes to be more readily ignited. The coating 2 has another function in that it completely surrounds the charcoal briquette 1 and prevents dust therefrom from entering the atmosphere. Moreover, when the coated briquettes are handled, the carbon from the charcoal is retained within the coating and cannot soil objects with which the treated briquettes come into contact.

The wax utilized in preparing the present composition may be any combustible wax such as paraffin, microcrystalline, montan, candelilla, carnauba, or other natural or synthetic waxes. A preferred material because of its low cost is a wax commonly known as "match wax," primarily a paraffin wax which is not highly refined. Additionally, the entire range of petroleum waxes may be used, extending from crude scale waxes to fully refined paraffins with melting points as high as 150° F. or more. The crude scale waxes include oils that may give off an unpleasant odor during early stages of combustion, which in no way affects the total usefulness, but may be objectionable for esthetic reasons. The high melting point waxes that are more fully refined give a cleaner and better flame with less development of odor. In general, wax price and freedom from oil contaminants, to a degree that an undesirable odor is not produced, are the key decision points in selecting of a wax.

The finely divided substantially non-flammable mineral used to prepare the present composition should have a high surface area and be sufficiently porous to absorb wax in the pores thereof. When the wax is ignited, the mineral provides controlled release of the volatile combustible materials from the wax composition and provides a slow and controlled flame. Although the precise mechanism whereby this is accomplished is not completely known, it is believed that the porous mineral material, in releasing the volatile wax, acts as a catalyst to control the combustion thereof. One advantage which results is that, since combustion of the volatile material takes place as it is released from the porous mineral material, the mineral provides protection in the nature of a shield from the wind and prevents the flame from going out. Moreover, because the mineral material is porous and finely particulate, the coating does not choke off the combustion of the charcoal inside the coating.

In addition to the improved chemical properties, discussed above, improved physical properties also result. The incorporation of the mineral material renders the coating harder than ordinary wax. Consequently, the wax coating is prevented from being rubbed off by physical contact. Moreover, the mineral provides body to the wax and prevents the wax from dripping off the fuel lumps either during application or during combustion. Additionally, whereas when fuel lumps or particles are dipped in a wax free of mineral particles only a very thin coating can be applied thereon, when the present composition containing fly ash or a similar mineral is utilized, a much thicker coating can be applied.

The finely particulate or finely divided mineral material employed in the present invention is fly ash, a finely particulate substantially nonflammable mineral material recovered from the flues of large scale heating systems and boilers and generally comprised of various silicates and oxides, including iron oxide and a small amount of residual carbon. The term "substantially non-flammable" is utilized in reference to fly ash since the fly ash may contain a small amount of residual carbon resulting from incomplete combustion of the fuel from which the fly ash is obtained.

The coating composition of the present invention should contain, for best results as to flame stability, combustion control, and binding quality from about 40 to about 55 percent by weight of fly ash, with 50 percent being optimum.

A sufficient amount of the composition should be applied to the coated fuel lumps or particles so that the amount of wax contained therein is at least about 10 percent that of the total weight of the coating and fuel lumps. Sufficient amounts of the coating composition may be used so that the wax component including fly ash comprises as much as 50 percent of the overall coated lump weight. A preferred composition is one wherein the coating comprises about 20 percent of the total weight of the coating and fuel lumps, and the wax therein comprises about 10 percent of the total weight. Such a composition provides a burning time of about eight minutes, a period sufficient to ignite the briquette interior easily. If more wax is applied, the fire may take longer than necessary to ready itself (become smoke free); if less than this amount, insufficient ignition and long delays may result.

In order to prepare the treated fuel according to the invention, a coating composition is prepared by mixing the desired amount of fly ash into the wax such as paraffin maintained above its melting point. The fuel lumps or bodies, as for example charcoal briquettes, are dipped into the molten composition, removed, and then permitted to cool to room temperature to harden the coating. Alternatively, the composition may be prepared by dissolving the wax in an organic solvent in which it is soluble and dispersing the fly ash therein. A coating may be applied to the charcoal briquettes by dipping, spraying, or other suitable methods, and the coating then permitted to dry by evaporating the solvent contained in the composition.

The following example is given by way of illustration only and is not to be construed as limiting.

*Example 1*

Approximately 12 gallons (85 pounds) of refined paraffin petroleum wax (M.P. 135/143° F.) were melted in a 17-gallon, steam jacketed mixing tank and brought to a temperature of 270° F. Under agitation supplied by a standard Lightning Mixer, 75 pounds of boiler fly ash were added gradually until a viscosity analogous to a thick cream was attained. While the coating composition remained under continuous agitation, a large mesh wire basket filled with charcoal briquettes to be coated was lowered into the composition and immediately removed. The basket was shaken vigorously to remove any excess coating material, and the hot contents dumped out on a piece of silicone-treated parchment for cooling. When cool, the coated briquettes were placed on a grill, and the coating composition ignited by a lighted paper taper. The flame spread throughout the coating on the briquettes and the charcoal itself was subsequently ignited and provided a hot clean flame.

*Example 2*

A mesh wire basket containing cannel coal was immersed in the composition of Example I and treated in similar manner. When cooled the cannel coal was readily ignited by means of a lighted paper taper, the coal itself being completely ignited by the time the coating composition had been consumed.

*Example 3*

A one-gallon paperboard container was placed below a spout on a heated kettle containing the composition of Example 1. A lump of cannel coal capable of being confined within the dimensions of the paperboard container was placed loosely in the container. Large voids were filled with smaller pieces of cannel coal. Liquid of the composition of Example 1 was poured into the container to fill the remaining interstices, thus effectively encapsulating the various pieces of coal. After cooling, the container itself was readily ignited with a match and burned along with its contents to give a clear flame typical of cannel coal. Some samples were left unattended and burned for as long as 8 hours. Other samples were occasionally agitated with a poker to accelerate the burning rate to a point where heat was given off more rapidly and the entire mixture was consumed within four hours.

Such coated cannel coal products can also be prepared by casting the ingredients together in molds of metal or the like for subsequent packaging or by extruding a mixture of coal and coating through a water-cooled nozzle to provide coated fuel of uniform dimensions for subsequent packaging.

The coating procedure described above may be modified to render it more commercially adaptable, as follows:

(1) An enclosed wire mesh conveyor may be arranged to dip into a tank of molten coating and undergo a shaking action to achieve similar results. Batchwise the same process may be carried out with large baskets hanging from overhead chains.

(2) A simplified version of a curtain coater may be made to impinge on a mesh conveyor of uncoated briquettes, passing over the briquettes and through the moving mesh, whereafter the briquettes may be subjected to sufficient rolling and tumbling action to remove excess material.

(3) Charcoal briquettes have a density which enables them to float in the coating composition. This property permits a process involving skim coating means to be utilized, whereby the individual pieces are tumbled into a tank of agitated mineral-wax coating and are skimmed off into a moving conveyor or similar operation with paddles, surface flows, or by centrifugal means.

(4) Cannel or other coal can be covered with the coating material by casting in a combustible finished package to produce a clean burnable material for fireplace use that is uniform in size and composition and far more convenient than the ordinary cannel coal of commerce.

(5) Lump cannel or other coal can be covered with or placed into the coating material to give a product of uniform shape without free dirt, oil or dust, which can subsequently be placed in packages of standardized sizes.

(6) Smaller fragments of cannel or other coal can be mixed with a slurry of paraffin and fly ash, or other particulate mineral materials as disclosed herein, and extruded by techniques well known to those familiar with the art, e.g., through a water-cooled nozzle, to produce endless shapes of fuel having a uniform cross-section.

Although fuel lumps and briquettes treated to accelerate ignition and to prevent dust have been disclosed in the prior art, the present invention provides many advantages over the prior art products. Whereas the wax coating of prior art products often burns off rapidly without igniting the charcoal over which it is coated, the coating of the present invention burns at more uniform rate and for a longer period and has been found to be far more effective in igniting the charcoal. The reason for this is not entirely clear. However, it is believed that the porous structure of the fly ash absorbs the molten wax, and when ignited releases the flammable vapors in a controlled manner. Furthermore, the highly permeable nature of the already consumed ash permits the easy passage of oxygen and vaporous burnable materials so that internal combustion is neither retarded nor eliminated. The fly ash also tends to form a sheath which protects the flame from external influences, notably wind, producing a low flame of exceptional stability. The fly ash binds the wax coating so that even at combustion temperatures molten material will not ordinarily drip or run in the grill. The present coating presents much the same appearance as the original briquette, but is highly breakage resistant and dust free. The coating is also water-proof so that no inconvenience need result from accidental wetting. Additionally, none of the dirt and black dust normally associated with charcoal briquettes is present with the coated product.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:

1. A readily ignitable dust-free fuel selected from the group consisting of charcoal briquettes and cannel coal, having a coating thereon, said coating comprising a composition of wax and fly ash dispersed therein, said coating composition comprising about 40 to about 55 percent by weight of fly ash, the proportion by weight of said coating composition to said fuel being about 20 percent to about 50 percent.

2. A readily ignitable dust-free charcoal briquette having a coating thereon, said coating comprising a composition of wax and fly ash dispersed therein, said coating composition comprising about 40 to about 55 percent by weight of fly ash, the proportion by weight of said coating composition to said coated briquette being about 20 percent to about 50 percent.

3. A readily ignitable dust-free lump of cannel coal having a coating thereon comprising a composition of wax and fly ash dispersed therein, said coating composition comprising about 40 to about 55 percent by weight of fly ash, the proportion by weight of said coating composition to said coated cannel coal lump being about 20 percent to about 50 percent.

4. A fuel according to claim 2 wherein said wax comprises about 50 percent by weight of said composition and said composition comprises about 20 percent by weight of said coated fuel body.

References Cited

UNITED STATES PATENTS

| | | | |
|---|---|---|---|
| 246,614 | 9/1881 | Jones | 44—6 |
| 323,058 | 7/1885 | Mitchell et al. | 44—7.5 |
| 2,391,988 | 1/1946 | Loane et al. | 44—7.5 |
| 2,443,029 | 6/1948 | Elkan | 44—34 |
| 2,842,431 | 7/1958 | Robertson | 44—6 |
| 2,976,133 | 3/1961 | Stueler | 44—41 |

DANIEL E. WYMAN, *Primary Examiner.*

C. F. DEES, *Assistant Examiner.*